(12) United States Patent
Im et al.

(10) Patent No.: US 10,749,413 B2
(45) Date of Patent: Aug. 18, 2020

(54) INVERTER BUILT-IN BRUSHLESS DIRECT CURRENT MOTOR

(71) Applicant: Hanon Systems, Daejeon (KR)

(72) Inventors: Ho Bin Im, Daejeon (KR); Sang Hun Kim, Daejeon (KR); Tae Wan Kim, Daejeon (KR); Hee Kwon Park, Daejeon (KR); Kyung Hun Jung, Daejeon (KR); Seong Kook Cho, Daejeon (KR)

(73) Assignee: Hanon Systems, Daejeon (KR)

( * ) Notice: Subject to any disclaimer, the term of this patent is extended or adjusted under 35 U.S.C. 154(b) by 309 days.

(21) Appl. No.: 15/673,686

(22) Filed: Aug. 10, 2017

(65) Prior Publication Data

US 2018/0048219 A1 Feb. 15, 2018

(30) Foreign Application Priority Data

Aug. 11, 2016 (KR) .................. 10-2016-0102195
Apr. 21, 2017 (KR) .................. 10-2017-0051636

(51) Int. Cl.
*H02K 11/33* (2016.01)
*H02K 5/16* (2006.01)
*H02K 5/10* (2006.01)
*H02K 11/00* (2016.01)

(52) U.S. Cl.
CPC ............. *H02K 11/33* (2016.01); *H02K 5/10* (2013.01); *H02K 5/163* (2013.01); *H02K 5/165* (2013.01); *H02K 11/0094* (2013.01)

(58) Field of Classification Search
CPC ........ H02K 11/33; H02K 11/30; H02K 11/04; H02K 11/05; H02K 11/0094; H02K 2203/03; H02K 5/10; H02K 5/163; H02K 5/165; H02K 7/085; H02K 7/086

USPC .................... 310/67 R, 68 R, 68 D
See application file for complete search history.

(56) References Cited

U.S. PATENT DOCUMENTS

| | | | | |
|---|---|---|---|---|
| 2011/0291496 | A1* | 12/2011 | Bobelis | ............ H02K 5/10 310/12.23 |
| 2013/0342084 | A1* | 12/2013 | Su | ............ H02K 9/06 310/60 R |
| 2016/0072355 | A1* | 3/2016 | Jang | ............ H02K 5/1672 310/88 |

FOREIGN PATENT DOCUMENTS

| | | |
|---|---|---|
| CN | 202050334 U | 11/2011 |
| JP | 2001142023 A | 5/2001 |
| JP | 2006238627 A | 9/2006 |
| JP | 2007107555 A | 4/2007 |
| JP | 2009189178 A | 8/2009 |
| JP | 2010245174 A | 10/2010 |
| JP | 2012085474 A | 4/2012 |
| JP | 2013106364 A | 5/2013 |

(Continued)

*Primary Examiner* — Nguyen Tran
(74) *Attorney, Agent, or Firm* — Norton Rose Fulbright US LLP; James R. Crawford

(57) ABSTRACT

Provided is an inverter built-in BLDC motor including: an inverter housing having one side coupled to a motor, an inside formed to be hollow, and the other side formed to be open, and having a PCB substrate provided in the hollow portion; a bearing mounted in a bearing mounting portion of the inverter housing and having a rotating shaft of a rotor of the motor rotatably coupled thereto; and a bearing cover coupled to a bearing mounting groove of the bearing mounting portion mounted with the bearing and formed to close an opening portion of the bearing mounting groove on an inner bottom surface of the inverter housing.

11 Claims, 9 Drawing Sheets

(56) References Cited

FOREIGN PATENT DOCUMENTS

| | | | |
|---|---|---|---|
| JP | 2014117060 | A | 6/2014 |
| KR | 101355253 | B1 | 1/2014 |

* cited by examiner

PRIOR ART

INVERTER BUILT-IN BRUSHLESS DIRECT CURRENT MOTOR

CROSS-REFERENCE TO RELATED APPLICATIONS

This application claims priority under 35 U.S.C. § 119 to Korean Patent Application No. 10-2016-0102195, filed on Aug. 11, 2016 and No. 10-2017-0051636 filed on Apr. 21, 2017 in the Korean Intellectual Property Office, the disclosure of which is incorporated herein by reference in its entirety.

TECHNICAL FIELD

The following disclosure relates to an inverter built-in brushless direct current (BLDC) motor, and more particularly, to an inverter built-in BLDC motor capable of improving heat radiation performance of an inverter unit provided for controlling a motor.

BACKGROUND

A brushless direct current (BLDC) motor may prevent friction and wear which are disadvantages of the existing DC motor and have relatively high efficiency. Therefore, recently, hybrid cars tend to adopt the BLDC motor as a motor for rotating a cooling fan.

The BLDC motor is a motor that does not have a brush and a commutator necessary for a DC motor but has an electronic commutation mechanism installed therein.

Further, the existing BLDC motor assembly has a motor unit and an inverter unit that are formed integrally, and thus is configured of an inverter built-in BLDC motor. Here, as illustrated in FIG. 1, an inverter unit 20 is coupled to one side of a motor unit 10. Meanwhile, the inverter unit 20 is formed to include a PCB substrate provided in an internal space formed by an inverter housing 21 and a cover 22 that are coupled to each other.

Here, a motor head part 12 extends to be provided in the inverter housing 21 and is provided with a bearing 13 rotatably coupled to a rotating shaft 11 of a rotor 16 provided in the motor unit 10. At this time, a sealing member such as an O-ring is assembled for sealing between the bearing disposed on the left side of FIG. 1 and the motor head part in the drawing, an O-ring cover is assembled to fix the O-ring, and a stop ring (snap ring) or the like is used to prevent the O-ring cover from being separated from the inverter housing.

As a result, there is a problem in that the sealing member is pressed to be damaged during the assembly, and therefore moisture may be infiltrated into the inverter unit and a plurality of parts are used, and therefore assembling performance is lowered and manufacturing cost is increased. Further, the inverter housing is provided with a groove into which the bearing is inserted. By the groove, an inner bottom surface of the inverter housing is concavely formed without being flattened. Therefore, it is difficult to radiate heat because heat is transferred through the groove portion, and it is difficult to design a PCB substrate because a switching device having a large amount of heat generation may not be disposed at a position opposite to the groove portion on the PCB substrate provided in the inverter unit.

RELATED ART DOCUMENT

KR 10-1355253 B1 (2014.01.17)

SUMMARY

An embodiment of the present invention is directed to providing an inverter built-in BLDC motor capable of disposing a switching device having a large amount of heat generation on a PCB substrate provided in an inverter unit, disposing the switching device even on a position at which a bearing cover is formed, and easily sealing the inverter unit, by coupling a groove with a bearing cover so that the groove inserted with a bearing may be assembled in the inverter housing and forming a sealing portion between the inverter housing and the bearing cover to transfer heat through the bearing cover portion and radiate the heat.

In one general aspect, an inverter built-in BLDC motor includes: an inverter housing 200 having one side coupled to a motor 100, an inside formed to be hollow, and the other side formed to be open, and having a PCB substrate 210 provided in the hollow portion; a bearing 140 mounted in the inverter housing 200 and having a rotating shaft of a rotor 110 of the motor 100 rotatably coupled thereto; and a bearing cover 230 coupled to a bearing mounting groove 221 of the inverter housing 200 mounted with the bearing 140 and formed to close an opening portion 222 of the bearing mounting groove 221 on an inner bottom surface 201 of the inverter housing 200.

The outer bottom surface 231 of the bearing cover 230 may be formed to coincide with the inner bottom surface 201 of the inverter housing 200.

Some of the switching devices 211 mounted on the PCB substrate 210 may be disposed at a position opposite to a portion where the bearing cover 230 is positioned.

The switching devices 211 may be disposed to contact the inner bottom surface 201 of the inverter housing 200 or the outer bottom surface 231 of the bearing cover 230.

An outer circumferential surface 232 of the bearing cover 230 may adhere to the inverter housing 200.

The inverter housing 200 may be provided with a seating groove 223 that is recessed on the inner bottom surface 201 and is connected to the bearing mounting groove 221 and has an inner diameter larger than that of the bearing mounting groove 221, and the bearing cover 230 may be inserted into and seated on the seating groove 223.

The inverter housing 200 may be provided with a sealing groove 224 that is recessed on the inner bottom surface 201, is connected to the seating groove 223, and has an inner diameter larger than that of the seating groove 223, and the sealing groove 224 may be filled with the sealing member 225.

The sealing member 225 may be formed not to protrude from the outer bottom surface 231 of the bearing cover 230 and the inner bottom surface 201 of the inverter housing 200.

The sealing member 225 may be made of a thermally conductive material.

A heat radiating grease 240 may be interposed between the inner bottom surface 201 of the inverter housing 200 and the PCB substrate 210 and between the outer bottom surface 231 of the bearing cover 230 and the PCB substrate 210.

An outer diameter of the bearing cover 230 may be formed to be larger than that of the bearing 140.

The bearing cover 230 may have a protrusion 233 protruding from the outer circumferential surface 232, and the inverter housing 200 may be provided with the coupling groove 226 corresponding to the protrusion 233 so that the protrusion 233 is inserted into the coupling groove 226.

Other features and aspects will be apparent from the following detailed description, the drawings, and the claims.

DETAILED DESCRIPTION OF MAIN ELEMENTS

Figure 1:
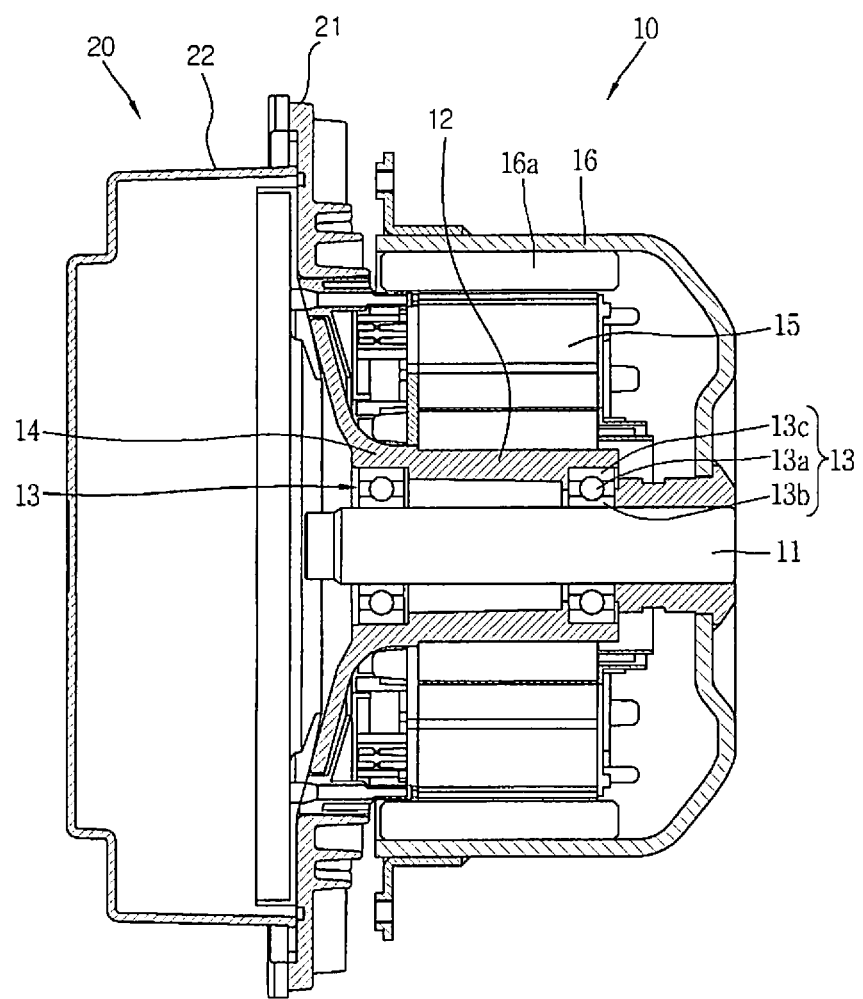
FIG. 1 is a cross-sectional view of the existing inverter built-in BLDC motor.

1000: Inverter built-in BLDC motor
100: Motor
110: Rotor
120: Rotating shaft
130: Permanent magnet
140: Bearing
150: Stator
200: Inverter housing
201: Inner bottom surface
210: PCB substrate
211: Switching device
220: Bearing mounting portion
221: Bearing mounting groove
222: Opening portion
223: Seating groove
224: Sealing groove
225: Sealing member
226: Coupling groove
230: Bearing cover
231: Outer bottom surface
232: Outer circumferential surface
233: Protrusion
240: Heat radiating grease
300: Cover

DETAILED DESCRIPTION OF EMBODIMENTS

Hereinafter, an inverter built-in BLDC motor according to an exemplary embodiment of the present invention having a configuration as described above will be described in detail with reference to the accompanying drawings.

Figure 2:
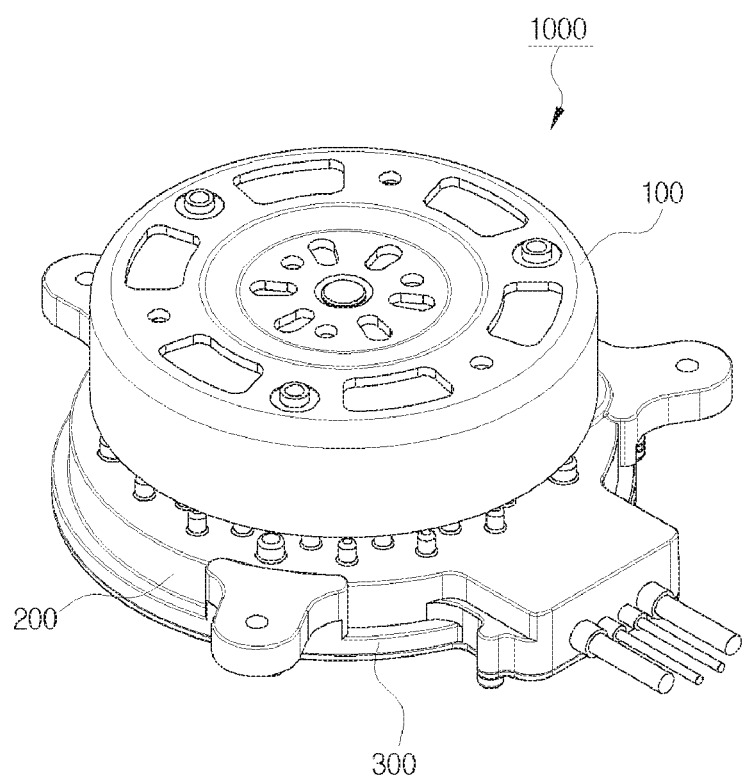
FIGS. 2 to 4 are an assembled perspective view, an exploded perspective view, and a cross-sectional view of an inverter built-in BLDC motor according to an exemplary embodiment of the present invention.
Figure 3:
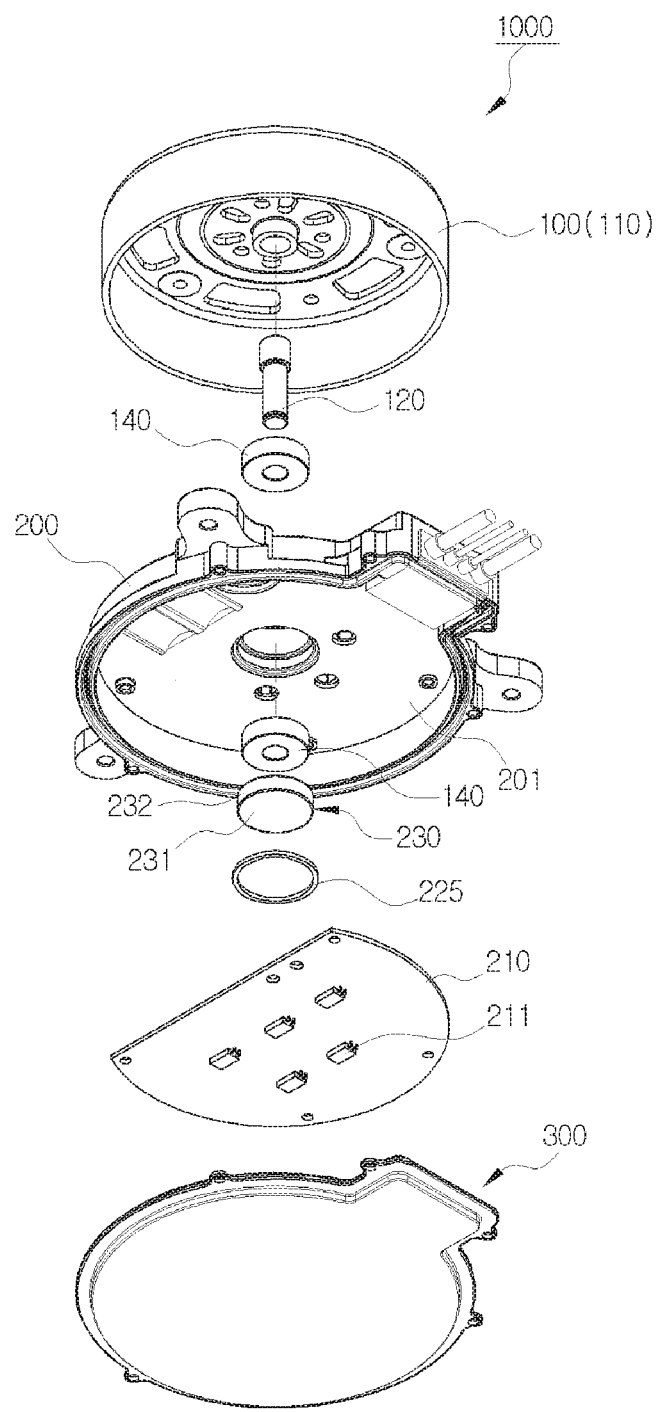
Figure 4:
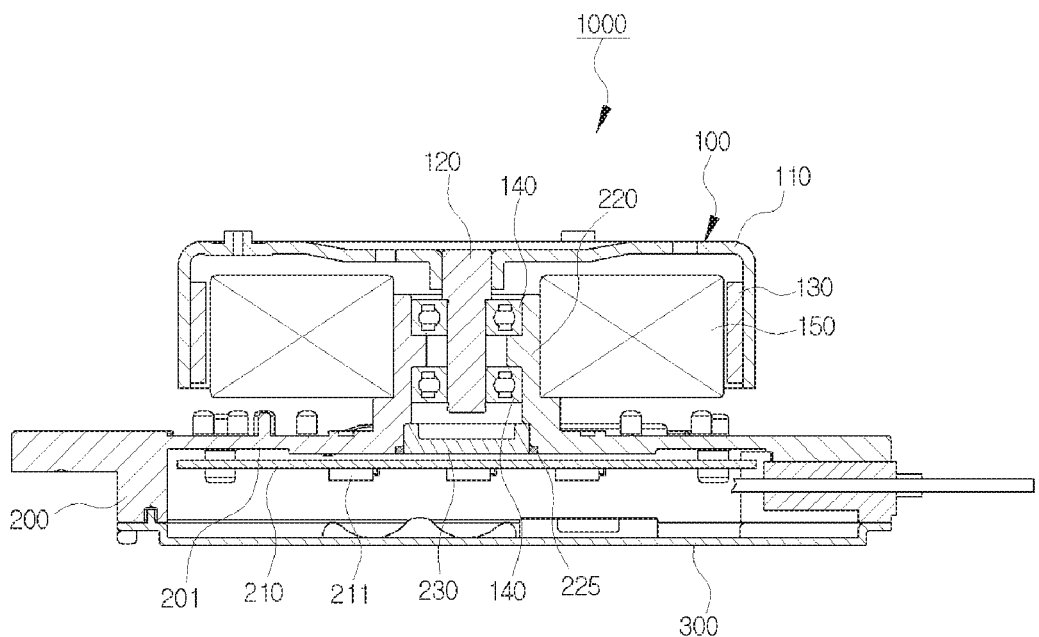
Figure 5:
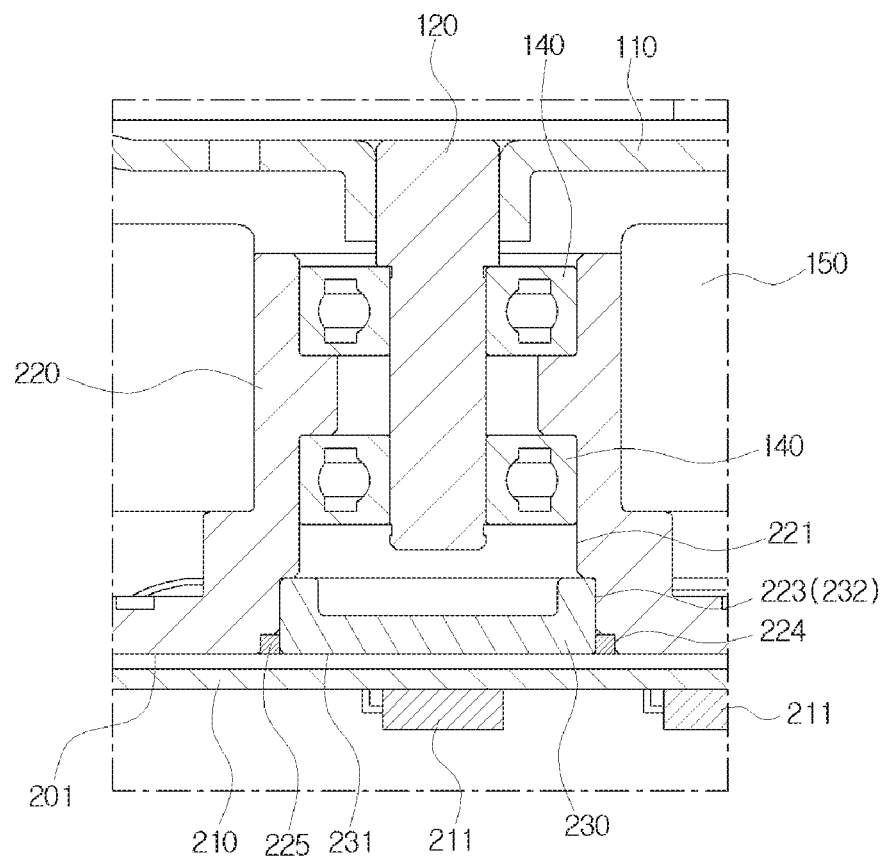
FIGS. 5 and 6 are partial cross-sectional views illustrating examples in which a switching device is disposed at a portion where a bearing cover according to an exemplary embodiment of the present invention is disposed.

FIGS. 2 to 4 are an assembled perspective view, an exploded perspective view, and a cross-sectional view of an inverter built-in BLDC motor according to an exemplary embodiment of the present invention and FIG. 5 is a partial enlarged view of FIG. 4.

As illustrated, an inverter built-in BLDC motor 1000 according to an exemplary embodiment of the present invention may include an inverter housing 200 having one side coupled to a motor 100, an inside formed to be hollow, and the other side formed to be open, and having a PCB substrate 210 provided in the hollow portion; a bearing 140 mounted in the inverter housing 200 and having a rotating shaft 120 of a rotor 110 of the motor 100 rotatably coupled thereto; and a bearing cover 230 coupled to a bearing mounting groove 221 of the inverter housing 200 mounted with the bearing 140 and formed to close an opening portion 222 of the bearing mounting groove 221 at an inner bottom surface 201 of the inverter housing 200.

First, the motor 100 may be a brushless direct current (BLDC) motor. In this case, the motor 100 may be an inner type BLDC motor whose inner side is provided with a rotor and outer side is provided with a stator to rotate the rotor on the inner side thereof. According to the exemplary embodiment of the present invention, however, an outer type BLDC motor whose inner side is provided with a stator 150 around which a driving coil is wound and outer side is provided with a rotor 110 covered in a casing form and coupled to a permanent magnet 130 to rotate the rotor 110 on the outer side thereof will be described by way of example.

The inverter housing 200 has an upper side coupled to the motor 100, a lower side formed to be open, and an inside formed to be hollow. Here, the hollow portion may be provided with the PCB substrate 210 for operating the motor 100 to couple between the PCB substrate 210 and the motor 100. Further, the PCB substrate 210 may be connected to the outside through a power line and a communication line and may be provided with switching devices 211 for controlling the motor 100. Further, the cover 300 may be coupled to the inverter housing 200 to form an empty space therein, and the PCB substrate 210 may be provided in the space formed therein. Further, the cover 300 may be coupled to the open lower side of the inverter housing 200 and may be formed so that the surface where the inverter housing 200 and the cover 300 are coupled to each other is sealed. Further, the inverter housing 200 may be provided with a bearing mounting portion 220 protruding upward from a central portion thereof, in which the bearing mounting portion 220 is provided with a through hole formed to penetrate through an upper surface of the bearing mounting portion 220 and the inner bottom surface 201 of the inverter housing 200 up and down, and may be provided with the bearing mounting groove 221 vertically formed to be stepped in a penetrated inside.

The bearing 140 may be inserted into and mounted on the bearing mounting groove 221 in the bearing mounting portion 220 of the inverter housing 200 and the rotating shaft 120 of the rotor 110 of the motor 100 may be rotated while being coupled to the bearing 140. Here, the bearing mounting portion 220 may be formed to protrude toward the outer side opposite to the inner side at which the PCB substrate 210 is disposed in the inverter housing 200 and the bearing mounting portion 220 that is formed to protrude may be fixedly inserted with the stator 150 of the motor 100. Further, the inner side of the bearing mounting portion 220 may be provided with the through hole penetrated up and down to be provided with the rotating shaft 120 and the bearing mounting groove 221 is concavely formed to be larger than an inner diameter of the through hole so as to be stepped from the through hole so that the bearing 140 may be seated in the bearing mounting groove 221. At this time, as illustrated, a pair of bearings 140 may be vertically spaced from each other so as to stably support the rotating shaft 120. In this case, the bearing mounting grooves 221 are easily inserted with the bearings 140, one of which may be concavely formed from an upper side of the bearing mounting portion 220 and the other of which may be concavely formed from the inner bottom surface 201 of the inverter housing 200.

The bearing cover 230 may be coupled to the inverter housing 200 on the side of the bearing 140 that is disposed to be relatively close to the inner bottom surface 201 of the inverter housing 200. For example, the bearing cover 230 may be inserted into the bearing mounting groove 221 while being formed in a cap form in which the surface facing the bearing 140 is concavely formed. Therefore, the bearing cover 230 may be coupled to the inverter housing 200 to close the opening portion 222 that is formed to be opened by the bearing mounting groove 221 on the inner bottom surface 201 side of the inverter housing 200. Here, as illustrated, the opening portion 222 is an opened portion formed with the bearing mounting groove 221 on the inner bottom surface 201 of the inverter housing 200, and the bearing cover 230 may be coupled to the inverter housing 200 to close the opening. At this time, the bearing cover 230 may be preferably made of a material having high thermal conductivity to smoothly perform thermal conduction with the inverter housing 200 and the bearing cover 230 may be made of a material having thermal conductivity similar to or higher than that of the inverter housing 200.

As described above, the inverter built-in type BLDC motor according to the exemplary embodiment of the present invention may transfer heat generated from the PCB substrate mounted with the switching device to the outside along the inverter housing through the bearing cover to radiate heat, and may include the switching device having a large amount of heat generation on the PCB substrate provided in the inverter unit and the switching device even on the part corresponding to the position where the bearing cover is formed, thereby improving the freedom in designing the PCB substrate including the switching device of the inverter unit.

Further, the outer bottom surface 231 of the bearing cover 230 may be formed to coincide with the inner bottom surface 201 of the inverter housing 200.

That is, as illustrated, the outer bottom surface 231 of the bearing cover 230 is formed to coincide with the inner bottom surface 201 of the inverter housing 200, such that a distance between the PCB substrate 210 and the inner bottom surface 201 of the inverter housing 200 may be formed to be equal to that between the PCB substrate 210 and the outer bottom surface 231 of the bearing cover 230. Therefore, the heat generated from the PCB substrate 210 on which the switching devices 211 are mounted may be uniformly transmitted to the inverter housing 200 and the bearing cover 230 to be radiated to the outside, such that the PCB substrate 210 may be freely designed irrespective of the position where the bearing cover 230 is formed.

In addition, some of the switching devices 211 mounted on the PCB substrate 210 may be disposed at a position opposite to a portion where the bearing cover 230 is positioned.

That is, as illustrated in FIG. 5, the switching device 211 may be disposed even on the portion of the PCB substrate 210 at the position corresponding to the bearing cover 230 to easily radiate the heat generated from the switching device 211, such that the switching devices 211 may be designed to be freely disposed.

In addition, the switching devices 211 are disposed to contact the inner bottom surface 201 of the inverter housing 200 or the outer bottom surface 231 of the bearing cover 230.

Figure 6:
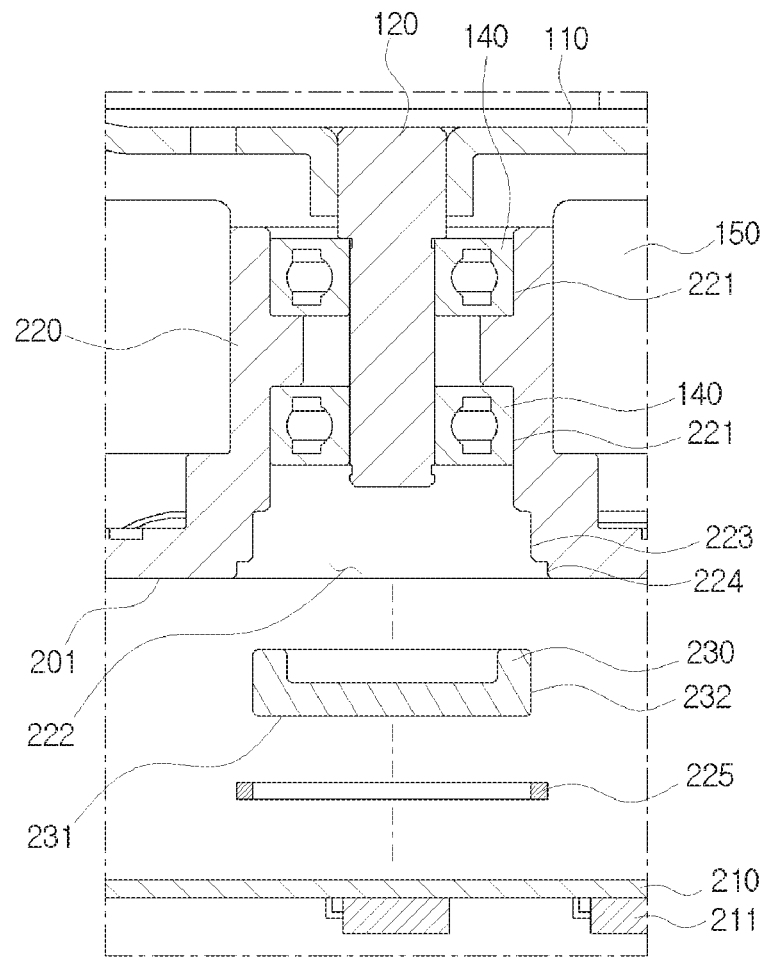

Here, the PCB substrate 210 may be disposed to be spaced apart from the inverter housing 200 for electrical insulation, such that the inner bottom surface 201 of the inverter housing 200 and the PCB substrate 210 are separated from each other. At this time, as illustrated in FIG. 6, the switching devices 211 are mounted on the PCB substrate 210 and the switching devices 211 are disposed between the inner bottom surface 201 of the inverter housing 200 and the PCB substrate 210, such that the switching devices 211 may be in contact with the inner bottom surface 201 of the inverter housing 200 or the outer bottom surface 231 of the bearing cover 230.

Therefore, the heat generated from the switching device may be directly conducted and radiated, which is advantageous in the heat radiation.

Further, an outer circumferential surface 232 of the bearing cover 230 may adhere to the inverter housing 200.

That is, since the outer circumferential surface 232, which is the outer circumferential surface of the bearing cover 230, adheres to the inverter housing 200, such that heat may be smoothly transferred from the bearing cover toward the inverter housing. At this time, the outer circumferential surface 232 of the bearing cover 230 and the contact surface of the inverter housing 200 may adhere to each other by thermal grease, or the like to reduce a thermal resistance at a contact interface between the outer circumferential surface of the bearing cover 230 and the inverter housing 200, thereby improving the thermal conductivity.

Further, the inverter housing 200 may be provided with a seating groove 223 that is recessed on the inner bottom surface 201 and is connected to the bearing mounting groove 221 and has an inner diameter larger than that of the bearing mounting groove 221, such that the bearing cover 230 may be inserted into and seated on the seating groove 223.

That is, the seating groove 223 may be concavely formed in the inverter housing 200 so that the bearing cover 230 may be inserted and seated. At this time, the seating groove 223 may be concavely formed in the inner bottom surface 201 of the inverter housing 200 to be connected to the bearing mounting groove 221, and the inner diameter of the seating groove 223 may be formed to be larger than that of the bearing mounting groove 221.

Therefore, the bearing 140 may be easily inserted into the bearing mounting groove 221, and a depth at which the bearing cover 230 is inserted is limited so that a height of the inner bottom surface 201 of the inverter housing 200 and a height of the outer bottom surface 231 of the bearing cover 230 may be easily matched.

Further, the inverter housing 200 is provided with a sealing groove 224 that is recessed on the inner bottom surface 201, connected to the seating groove 223, and has an inner diameter larger than that of the seating groove 223, such that the sealing groove 224 may be filled with the sealing member 225.

That is, the sealing groove 224 may be filled with the sealing member 225 and concavely formed in the inverter housing 200 to seal between the outer circumferential surface 232 of the bearing cover 230 and the inverter housing 200. At this time, the sealing groove 224 may be concavely formed in the inner bottom surface 201 of the inverter housing 200 to be connected to the seating groove 223 in which the bearing cover 230 is seated, and the inner diameter of the sealing groove 224 may be formed to be larger than that of the seating groove 223. Further, the sealing member 225 may be made of, for example, silicon or the like, filled in the sealing groove 224, and then cured to be formed as the sealing member 225.

Thus, the space between the bearing cover and the inverter housing may be more easily sealed, and the sealing member may be confirmed by the appearance, so that the sealing performance may be improved. In addition, the sealing member may seal between the bearing cover and the inverter housing, thereby preventing water from penetrating from the motor into the inverter housing in which the PCB substrate is disposed.

Further, the sealing member 225 may be formed not to protrude from the outer bottom surface 231 of the bearing cover 230 and the inner bottom surface 201 of the inverter housing 200.

That is, since the switching devices 211 mounted on the PCB substrate 210 may be disposed to contact or be close to the outer bottom surface 231 of the bearing cover 230 or the inner bottom surface 201 of the inverter housing 200, the sealing member 225 may be formed not to protrude from the outer bottom surface 231 of the bearing cover 230 and the inner bottom surface 201 of the inverter housing 200 so as to prevent interference with the disposition of the switching devices 211 due to the sealing member 225.

In addition, the sealing member 225 may also be made of a thermally conductive material.

That is, the sealing member 225 may also be made of a thermally conductive material to improve the thermal conductivity, and may preferably be made of a material having an excellent sealing force.

Further, a heat radiating grease 240 may be interposed between the inner bottom surface 201 of the inverter housing 200 and the PCB substrate 210 and between the outer bottom surface 231 of the bearing cover 230 and the PCB substrate 210.

Figure 7:
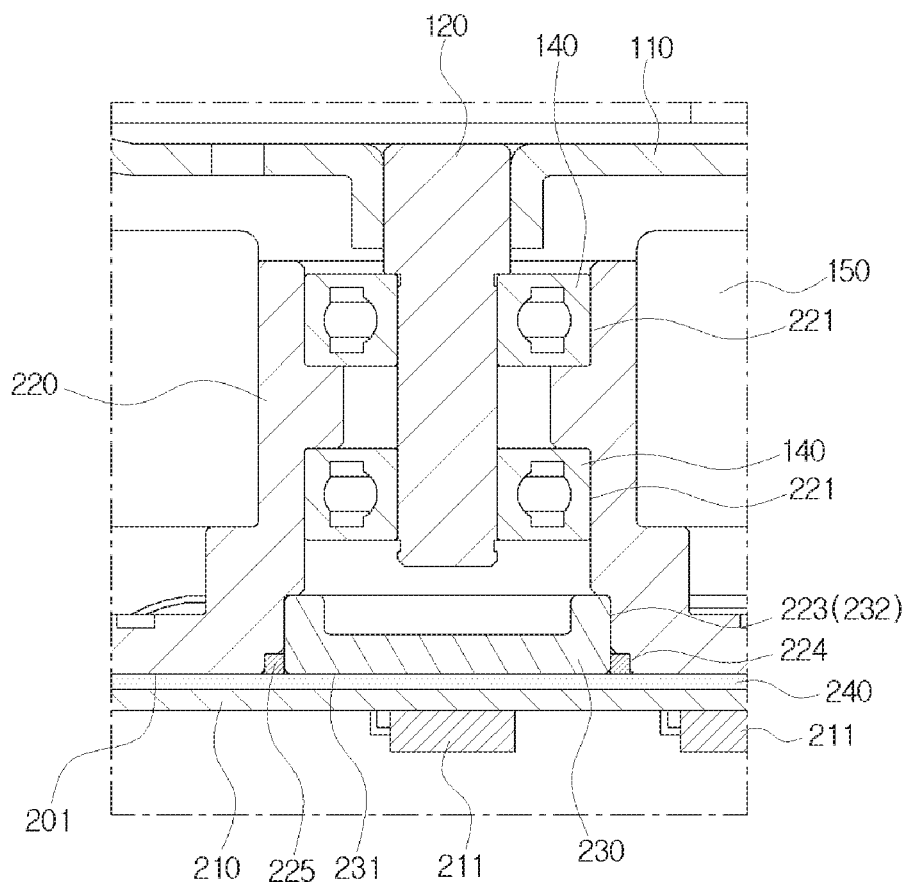
FIG. 7 is a partial cross-sectional view illustrating an example in which heat radiating grease according to an exemplary embodiment of the present invention is interposed between an inverter housing and a PCB substrate and between a bearing cover and the PCB substrate.

That is, as illustrated in FIG. 7, the heat radiating grease 240 like thermal grease may be interposed between the inner bottom surface 201 of the inverter housing 200 and the PCB substrate 210, including the outer bottom surface 231 of the bearing cover 230 which is the surface facing the upper surface of the PCB substrate 210, such that the heat generated from the PCB substrate 210 mounted with the switching devices 211 may be smoothly transferred to the bearing cover 230 and the inverter housing 200 by the heat radiating grease 240 to be radiated. In this way, the switching devices 211 may be easily cooled.

Further, an outer diameter of the bearing cover 230 may be formed to be larger than that of the bearing 140.

That is, the outer diameter of the bearing cover 230 is formed to be larger than that of the bearing 140 to form the seating groove 223 larger than the inner diameter of the bearing mounting groove 221 of the inverter housing 200 so that the bearing cover 230 may be inserted into the seating groove 223, thereby limiting the depth where the bearing cover 230 is inserted into the inverter housing 200. Further, it is possible to increase the thermal conductivity by widening the contact area between the bearing cover 230 and the inverter housing 200.

Further, the bearing cover 230 has a protrusion 233 protruding from the outer circumferential surface 232, and the inverter housing 200 is provided with a coupling groove 226 corresponding to the protrusion 233 so that the protrusion 233 may be inserted into the coupling groove 226.

Figure 8:
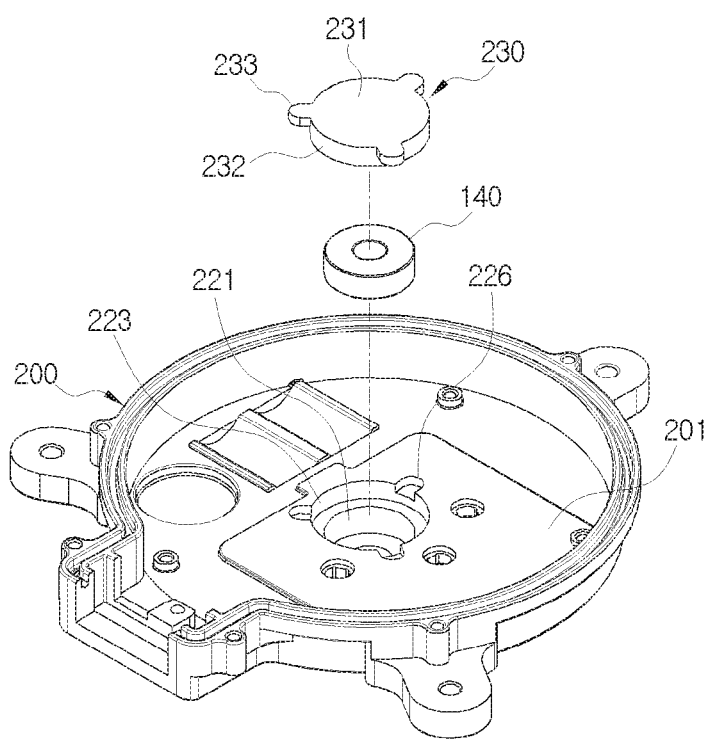
FIGS. 8 and 9 are an exploded perspective view and a plan view showing another example of the inverter housing and the bearing cover according to an exemplary embodiment of the present invention.
Figure 9:
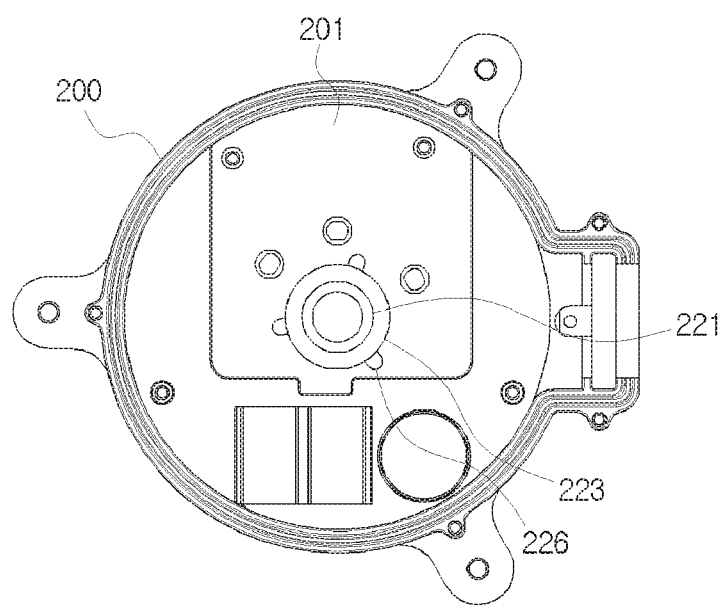

That is, as illustrated in FIGS. 8 and 9, the bearing cover 230 may be provided with the protrusion 233 protruding in the radial direction from the outer circumferential surface 232, and the protrusions 233 may be formed in plural while being spaced apart from each other along the circumferential direction. Further, since the inverter housing 200 is formed with the coupling grooves 226 corresponding to the protrusions 233, the bearing cover 230 may be coupled to the inverter housing 200 so that the protrusions 233 are inserted into the coupling grooves 226. In this way, the depth where the bearing cover 230 is inserted into the inverter housing 200 may be limited by the protrusion 233 and the coupling groove 226 even if there is no seating groove 223 in the state where the bearing mounting groove 221 is formed in the inverter housing 200 and the thermal conductivity may be increased by widening the contact area between the bearing cover 230 and the inverter housing 200.

The inverter built-in BLDC motor according to an exemplary embodiment of the present invention may transfer heat through the bearing cover portion and radiate the heat, such that the switching device having the large amount of heat generation may be disposed on the PCB substrate provided in the inverter unit and may be disposed even at the position at which the bearing cover is formed and the inverter unit may be easily sealed.

The present invention is not limited to the above-mentioned embodiments but may be variously applied, and may be variously modified by those skilled in the art to which the present invention pertains without departing from the gist of the present invention claimed in the claims.

What is claimed is:

1. An inverter built-in BLDC motor, comprising:
   an inverter housing having one side coupled to a motor, an inside formed to be hollow, and another side formed to be open, and having a PCB substrate provided in the hollow portion;
   a bearing mounted in the inverter housing and having a rotating shaft of a rotor of the motor rotatably coupled thereto; and
   a bearing cover coupled to a bearing mounting groove of the inverter housing mounted with the bearing and formed to close an opening portion of the bearing mounting groove on an inner bottom surface of the inverter housing,
   wherein a heat radiating grease is interposed between the inner bottom surface of the inverter housing and the PCB substrate and between an outer bottom surface of the bearing cover and the PCB substrate.

2. The inverter built-in BLDC motor of claim 1, wherein an outer bottom surface of the bearing cover is formed to coincide with the inner bottom surface of the inverter housing.

3. The inverter built-in BLDC motor of claim 2, wherein some of switching devices mounted on the PCB substrate is disposed at a position opposite to a portion where the bearing cover is positioned.

4. The inverter built-in BLDC motor of claim 3, wherein the switching devices are disposed to contact the inner bottom surface of the inverter housing or the outer bottom surface of the bearing cover.

5. The inverter built-in BLDC motor of claim 1, wherein an outer circumferential surface of the bearing cover adheres to the inverter housing.

6. The inverter built-in BLDC motor of claim 1, wherein the inverter housing is provided with a seating groove that is recessed on the inner bottom surface and is connected to the bearing mounting groove and has an inner diameter larger than that of the bearing mounting groove, and the bearing cover is inserted into and seated on the seating groove.

7. The inverter built-in BLDC motor of claim 6, wherein the inverter housing is provided with a sealing groove that is recessed on the inner bottom surface, is connected to the seating groove, and has an inner diameter larger than that of the seating groove, and the sealing groove is filled with a sealing member.

8. The inverter built-in BLDC motor of claim 7, wherein the sealing member is formed not to protrude from the outer bottom surface of the bearing cover and the inner bottom surface of the inverter housing.

9. The inverter built-in BLDC motor of claim 7, wherein the sealing member is made of a thermally conductive material.

10. The inverter built-in BLDC motor of claim 1, wherein an outer diameter of the bearing cover is formed to be larger than that of the bearing.

11. The inverter built-in BLDC motor of claim 1, wherein the bearing cover has a protrusion protruding from an outer circumferential surface, and the inverter housing is provided with a coupling groove corresponding to the protrusion so that the protrusion is inserted into the coupling groove.

* * * * *